United States Patent
Muradov et al.

(10) Patent No.: US 10,041,307 B2
(45) Date of Patent: Aug. 7, 2018

(54) BALANCED THREAD FORM, TUBULARS EMPLOYING THE SAME, AND METHODS RELATING THERETO

(71) Applicant: National Oilwell Varco, L.P., Houston, TX (US)

(72) Inventors: Andrei Muradov, Houston, TX (US); Michael Joseph Jellison, Houston, TX (US)

(73) Assignee: NATIONAL OILWELL VARCO, L.P., Houston, TX (US)

( * ) Notice: Subject to any disclaimer, the term of this patent is extended or adjusted under 35 U.S.C. 154(b) by 669 days.

(21) Appl. No.: 14/602,947

(22) Filed: Jan. 22, 2015

(65) Prior Publication Data

US 2016/0215571 A1    Jul. 28, 2016

(51) Int. Cl.
*F16L 37/00* (2006.01)
*E21B 17/042* (2006.01)
*F16L 15/00* (2006.01)

(52) U.S. Cl.
CPC .......... *E21B 17/042* (2013.01); *F16L 15/001* (2013.01)

(58) Field of Classification Search
CPC .............................. E21B 17/042; F16L 15/001
USPC ................ 285/333, 334, 390; 72/370.18
See application file for complete search history.

(56) References Cited

U.S. PATENT DOCUMENTS

| | | | |
|---|---|---|---|
| 2,885,225 A * | 5/1959 | Rollins | E21B 17/042 285/334 |
| 3,355,192 A | 11/1967 | Kloesel, Jr. et al. | |
| 4,332,502 A | 6/1982 | Wormald et al. | |
| 4,537,429 A | 8/1985 | Landriault | |
| 4,609,212 A | 9/1986 | Hosang et al. | |
| 4,629,224 A | 12/1986 | Landriault | |
| 4,799,844 A | 1/1989 | Chuang | |

(Continued)

FOREIGN PATENT DOCUMENTS

| CA | 1085815 A1 | 9/1980 |
|---|---|---|
| CA | 1242474 A1 | 9/1988 |

(Continued)

OTHER PUBLICATIONS

International Patent Application No. PCT/US2016/012310 International Search Report and Written Opinion dated May 17, 2016 (14 pages).

*Primary Examiner* — Greg Binda
(74) *Attorney, Agent, or Firm* — Conley Rose, P.C.

(57) ABSTRACT

A tubular member has a longitudinal axis, a first end, and a second end. The tubular member includes a pin connector including an external shoulder, an internal shoulder axially spaced from the external shoulder, and a plurality of threads in a region between the external shoulder and the internal shoulder that taper relative to the longitudinal axis at 1.0 to 1.5 inches per foot. The threads include an axial density measured in a number of threads per inch (TPI), and when the pin connector is threadably engaged with a box connector, each of the threads contacts a corresponding box thread on the box connector along a projected radial distance $H_C$. In addition, the threads are configured such that the product of $2(\sqrt{3})(H_C)(TPI)$ is greater than or equal to 0.95 and less than or equal to 1.05.

16 Claims, 10 Drawing Sheets

(56) References Cited

U.S. PATENT DOCUMENTS

| | | |
|---|---|---|
| 4,822,081 A | 4/1989 | Blose |
| 4,958,973 A | 9/1990 | Sugimura |
| 5,060,740 A | 10/1991 | Yousef et al. |
| 5,127,784 A | 7/1992 | Eslinger |
| 5,492,375 A | 2/1996 | Smith |
| 5,788,401 A | 8/1998 | Drenth |
| 5,829,797 A | 11/1998 | Yamamoto et al. |
| 5,908,212 A | 6/1999 | Smith et al. |
| 6,030,004 A | 2/2000 | Schock et al. |
| 6,196,598 B1 | 3/2001 | Yao |
| 6,237,967 B1 | 5/2001 | Yamamoto et al. |
| 6,447,025 B1 | 9/2002 | Smith |
| 6,511,102 B2 | 1/2003 | Krug et al. |
| 6,698,802 B2 | 3/2004 | Nagasaku et al. |
| 6,755,447 B2 | 6/2004 | Galle, Jr. et al. |
| 6,767,035 B2 | 7/2004 | Hashem |
| 6,848,724 B2 | 2/2005 | Kessler |
| 6,916,248 B1 | 7/2005 | Burgess |
| 7,193,526 B2 | 3/2007 | Hall et al. |
| 7,210,710 B2 | 5/2007 | Williamson et al. |
| 7,299,555 B2 | 11/2007 | Muradov et al. |
| 7,331,614 B2 | 2/2008 | Noel et al. |
| 7,416,374 B2 | 8/2008 | Breihan et al. |
| 7,455,329 B2 | 11/2008 | Muradov et al. |
| 7,494,159 B2 | 2/2009 | Sugino |
| 7,690,697 B2 | 4/2010 | Church |
| 7,900,975 B2 | 3/2011 | Nakamura et al. |
| 8,220,844 B2 | 7/2012 | Gillot et al. |
| 8,579,049 B2 | 11/2013 | Kinsella |
| 8,668,232 B2 | 3/2014 | Mazzaferro et al. |
| 8,678,447 B2 | 3/2014 | Chin |
| 2004/0174017 A1 | 9/2004 | Brill et al. |
| 2005/0161215 A1 | 7/2005 | Hall et al. |
| 2005/0189147 A1 | 9/2005 | Williamson et al. |
| 2006/0006648 A1 | 1/2006 | Grimmett et al. |
| 2006/0214421 A1 | 9/2006 | Muradov |
| 2007/0214664 A1 | 9/2007 | Muradov et al. |
| 2007/0228729 A1 | 10/2007 | Grimmett et al. |
| 2008/0191479 A1 | 8/2008 | Suzuki |
| 2010/0308577 A1 | 12/2010 | Chin |
| 2011/0012347 A1 | 1/2011 | Pacheco |
| 2011/0132486 A1 | 6/2011 | Martin |
| 2011/0133449 A1 | 6/2011 | Mazzaferro et al. |
| 2011/0168286 A1 | 7/2011 | Koch et al. |
| 2012/0013123 A1 | 1/2012 | Back |
| 2012/0025522 A1 | 2/2012 | Granger et al. |
| 2012/0146327 A1 | 6/2012 | Watts |
| 2013/0164081 A1 | 6/2013 | Hermes et al. |
| 2013/0181442 A1 | 7/2013 | Sonobe et al. |
| 2013/0257037 A1 | 10/2013 | Nashery et al. |
| 2013/0277963 A1 | 10/2013 | Carrois et al. |
| 2014/0145433 A1 | 5/2014 | Hou et al. |
| 2014/0182426 A1 | 7/2014 | Mazzaferro et al. |
| 2014/0203556 A1 | 7/2014 | Besse |
| 2014/0333065 A1 | 11/2014 | Pacheco |
| 2015/0362100 A1* | 12/2015 | Li .................... F16L 15/06 285/390 |

FOREIGN PATENT DOCUMENTS

| | | |
|---|---|---|
| EP | 1705415 A2 | 9/2006 |
| EP | 1754920 A1 | 2/2007 |
| EP | 2325435 B1 | 10/2012 |
| WO | 00/20720 A1 | 4/2000 |
| WO | 2010118839 A1 | 10/2010 |
| WO | 2012089305 A1 | 7/2012 |

* cited by examiner

BALANCED THREAD FORM, TUBULARS EMPLOYING THE SAME, AND METHODS RELATING THERETO

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to threaded connections. More particularly, this disclosure relates to threaded connections for downhole tubulars (e.g., drill pipe).

Threaded tubulars are common in many industrial applications, such as, for example, oil and gas drilling, production, transportation, refining, etc. In oil and gas drilling operations, a drill bit is threadably attached at one end of a threaded tubular and the tubular is rotated (e.g., from the surface, downhole by a mud motor, etc.) in order to form a borehole. As the bit advances within the formation, additional tubulars are threadably attached at the surface, thereby forming a drill string. During these operations, it is desirable that the threaded connections between each adjacent tubular along the drill string have sufficient strength to withstand all expected service loads (e.g., torsion, tension, compression, etc.), such that the integrity of the drill string is ensured.

BRIEF SUMMARY OF THE DISCLOSURE

Some embodiments of this disclosure are directed to a threaded pin connector disposable at one end of a tubular member and having a longitudinal axis. In an embodiment, the threaded pin connector includes a pin external shoulder configured to engage a box external shoulder on a mating threaded box connector when the pin connector is threadably engaged with the box connector, and a pin internal shoulder axially spaced from the pin external shoulder, wherein the pin internal shoulder is configured to engage with a box internal shoulder on the box connector when the pin connector is threadably engaged with the box connector. In addition, the pin connector includes a plurality of threads in a region between the pin external shoulder and the pin internal shoulder that taper relative to the longitudinal axis at 1.0 to 1.5 inches per foot. Each of the plurality of the threads includes a crest, a root disposed radially inward from the crest, a stab flank extending between the crest and the root, and a load flank extending between the crest and the root, wherein the stab flank is more proximate the pin internal shoulder than the load flank. The plurality of the threads has a bearing strength that represents a measure of the force required to plastically deform the load flank. The plurality of the threads has a shear strength that represents a measure of the axial force required to shear the thread between the load flank and the stab flank. The plurality of the threads is configured such that the bearing strength is within +/−5% of the shear strength.

Other embodiments are directed to a method for manufacturing a tubular member including a longitudinal axis, a first end, and a second end opposite the first end. In an embodiment, the method includes (a) forming a threaded pin connector on the first end of the tubular member, wherein the threaded pin connector includes a pin external shoulder and a pin internal shoulder axially spaced from the pin external shoulder. In addition, the method includes (b) forming a threaded box connector on the second end of the tubular member, wherein the threaded box connector includes a box external shoulder and a box internal shoulder axially spaced from the box external shoulder. Further, the method includes (c) forming a plurality of pin threads along the pin member in a region between the pin external shoulder and the pin internal shoulder and a plurality of box threads along the box member in a region between the box external shoulder and the box internal shoulder. The pin threads and the box threads each taper relative to the longitudinal axis at 1.0 to 1.5 inches per foot, and the plurality of the pin threads and the plurality of box threads have an axial density measured in a number of threads per inch (TPI). Each of the plurality of pin threads and each of the plurality of box threads includes a crest, a root, a stab flank extending between the crest and the root, and a load flank extending between the crest and the root. The stab flank on each pin thread is more proximate the pin internal shoulder than the load flank on the pin thread. The stab flank on each box thread is more proximate the box external shoulder than load flank on the box thread. When the pin member is threadably engaged with a box member on another tubular member, each of the plurality of pin threads contacts a corresponding box thread along a projected radial distance $H_C$ along the load flank. When the box member is threadably engaged with a pin member on a another tubular member, each of the plurality of box threads contacts a corresponding pin thread along the projected radial distance $H_C$ along the load flank. The plurality of pin threads and box threads are configured such that the product of $2(\sqrt{3})(H_C)(TPI)$ for the pin threads and the box threads is greater than or equal to 0.95 and less than or equal to 1.05.

Still other embodiments are directed to a tubular member having a longitudinal axis, a first end, a second end opposite the first end. In an embodiment, the tubular member includes a first threaded box connector disposed at the first end and a first threaded pin connector disposed at the second end. The first pin connector includes a pin external shoulder configured to engage a box external shoulder on a second threaded box connector of another tubular member when the pin connector is threadably engaged with the second box connector and a pin internal shoulder axially spaced from the pin external shoulder, wherein the pin internal shoulder is configured to engage with a box internal shoulder on the second box connector when the pin connector is threadably engaged with the second box connector. In addition, the first pin connector includes a plurality of threads in a region between the pin external shoulder and the pin internal shoulder that taper relative to the longitudinal axis at 1.0 to 1.5 inches per foot. Each of the plurality of threads includes a crest, a root disposed radially inward from the crest, a stab flank extending between the crest and the root, and a load flank extending between the crest and the root. The stab flank is more proximate the pin internal shoulder than the load flank. The plurality of threads has an axial density measured in a number of threads per inch (TPI). When the pin connector is threadably engaged with the second box connector, each of the plurality threads on the threaded pin connector contacts a corresponding box thread on the second box connector along a projected radial distance $H_C$ along the load flank. The plurality of threads are configured such that the product of $2(\sqrt{3})(H_C)(TPI)$ is greater than or equal to 0.95 and less than or equal to 1.05.

Embodiments described herein comprise a combination of features and advantages intended to address various shortcomings associated with certain prior devices, systems, and methods. The foregoing has outlined rather broadly the features and certain technical advantages of the disclosed exemplary embodiments in order that the detailed description that follows may be better understood. The various characteristics described above, as well as other features, will be readily apparent to those skilled in the art upon reading the following detailed description, and by referring to the accompanying drawings. It should be appreciated by those skilled in the art that the conception and the specific exemplary embodiments disclosed may be readily utilized as a basis for modifying or designing other structures for carrying out the same purposes of the embodiments described herein.

BRIEF DESCRIPTION OF THE DRAWINGS

For a detailed description of the disclosed exemplary embodiments, reference will now be made to the accompanying drawings in which.

DETAILED DESCRIPTION OF EXEMPLARY EMBODIMENTS

Figure 1:
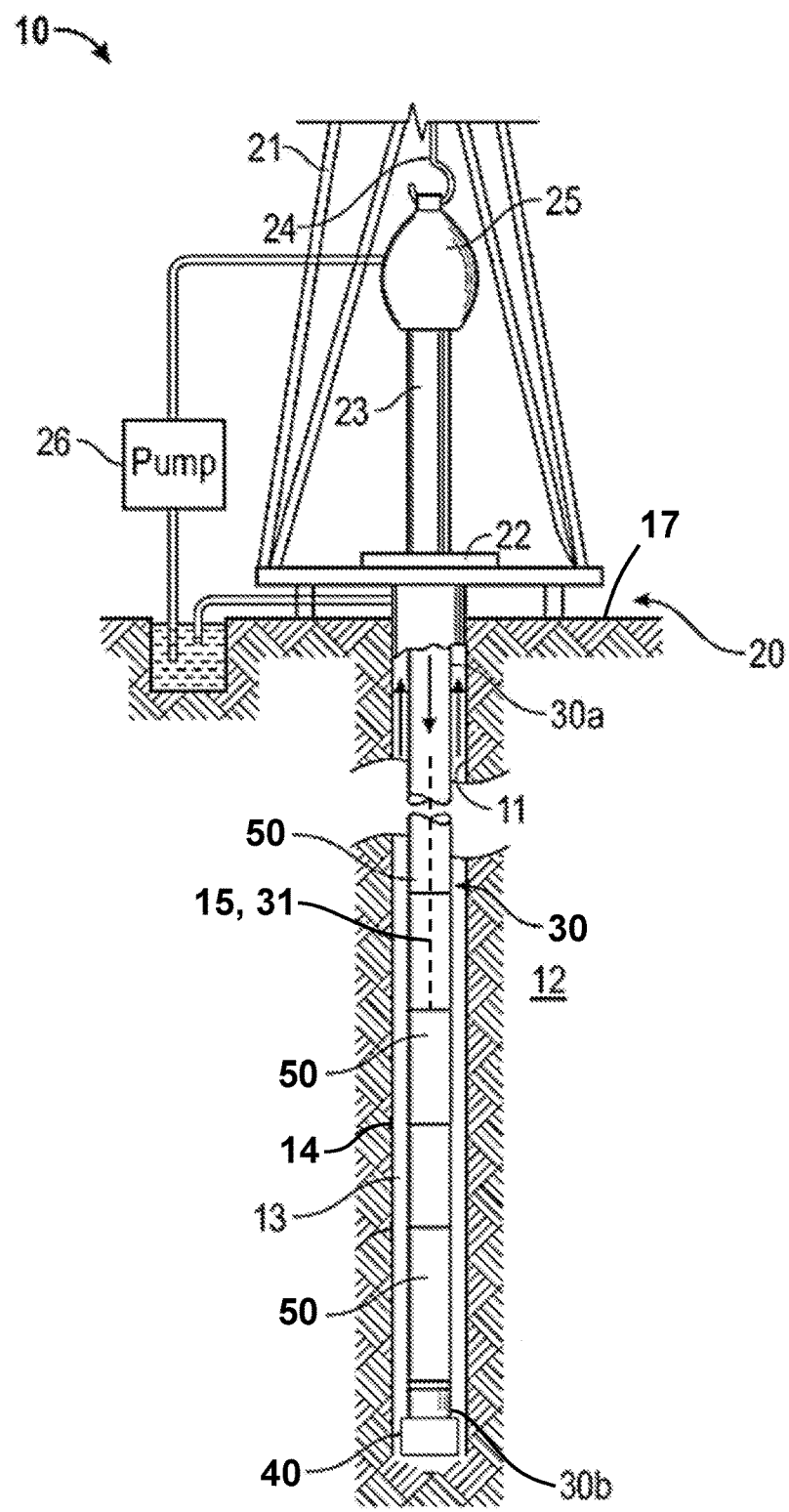
FIG. 1 is a schematic side view of an embodiment of a drilling system for drilling a borehole into a subterranean formation in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the words "approximately" and "substantially" mean plus or minus 10%.

As previously described, during oil and gas drilling operations, it is desirable that the threaded connections between adjacent tubulars forming the drill string have sufficient strength to withstand all expected service loads (e.g., torsion, tension, compression, etc.). Particularly, it is desirable that the threaded connections between adjacent tubular members making up the drill string have a sufficient torsional strength, which is a measure of the amount of torque applied about the centerline of the tubular connection required to cause failure. In order to optimize the resulting torsional strength of the threaded connections making up the drill string, the threads must be designed to have a sufficient bearing and shear strength to avoid the common failures resulting from elevated torsion. Bearing strength is a measure of the amount of force required to cause deformation (e.g., plastic deformation) of engaged surfaces (e.g., thread flanks) of the threaded connection, and the shear strength is a measure of the amount of force required to shear the threads between the thread flanks along a plane which is substantially parallel to the connection centerline.

If a threaded connection is over designed in terms of bearing strength, the threads may have an excessive radial height (i.e., the threads may be too "tall"), which thereby results in a reduction in the critical cross-sectional area (since the threads are cut radially deeper into the pin and box members) of the threaded connection, which contribute to an overall reduction in the torsional strength of the resulting connection. Alternatively, if a threaded connection is over designed in terms of shear strength, the threads may be excessively long along the connection centerline (e.g., axial length), which thereby reduces the available contact area at the internal shoulder, which also contribute to an overall reduction in the torsional strength of the resulting connection. Thus, this disclosure presents threaded connections (which in some embodiments may be double shouldered connections) for downhole tubulars (e.g., drill pipe, heavy weight drill pipe (HWDP), drill collars, and other drill stem components) that are designed to balance bearing strength and shear strength in an effort to optimize the overall torsional strength of the resulting connection.

Referring now to FIG. 1, an embodiment of a drilling system 10 is schematically shown. In this embodiment, drilling system 10 includes a drilling rig 20 positioned over a borehole 11 penetrating a subsurface formation 12, a casing 14 extending from the surface 17 into the upper portion of borehole 11 along a central or longitudinal axis 15, and a drillstring 30 suspended in borehole 11 from a derrick 21 of rig 20. Drill string 30 has a central or longitudinal axis 31 that, in this embodiment, is aligned with axis 15 of casing 14 (note: such alignment is not required), a first or uphole end 30a coupled to derrick 21, and a second or downhole end 30b opposite end 30a. In addition, drillstring 30 includes a drill bit 40 at downhole end 30b, and a plurality of drill pipe joints 50 (or more simply drill pipes 50) extending from bit 40 to uphole end 30a. Drill pipes 50 are connected end-to-end, and bit 40 is connected to a lower end of the lowermost pipe 50. A bottomhole assembly (BHA) (not shown) can be disposed in drill string 30 proximal the bit 40 (e.g., axially between bit 40 and the lowermost pipe 50).

In this embodiment, drill bit 40 is rotated by rotation of drill string 30 from the surface. In particular, drill string 30 is rotated by a rotary table 22 that engages a kelly 23 coupled to uphole end 30a of drillstring 30. Kelly 23, and hence drill string 30, is suspended from a hook 24 attached to a traveling block (not shown) with a rotary swivel 25 which permits rotation of drill string 30 relative to derrick 21. Although drill bit 40 is rotated from the surface with drill string 30 in this embodiment, in general, the drill bit (e.g., drill bit 40) can be rotated with a rotary table or a top drive, rotated by a downhole mud motor disposed in the BHA, or combinations thereof (e.g., rotated by both rotary table via the drillstring and the mud motor, rotated by a top drive and the mud motor, etc.). For example, rotation via a downhole motor may be employed to supplement the rotational power of a rotary table 22, if required, and/or to effect changes in the drilling process. Thus, it should be appreciated that the various aspects disclosed herein are adapted for employment in each of these drilling configurations.

During drilling operations, a mud pump 26 at the surface 17 pumps drilling fluid or mud down the interior of drill string 30 via a port in swivel 25. The drilling fluid exits drill string 30 through ports or nozzles in the face of drill bit 40, and then circulates back to the surface 17 through the annulus 13 between drill string 30 and the sidewall of borehole 11. The drilling fluid functions to lubricate and cool drill bit 40, carry formation cuttings to the surface, and maintain the pressure necessary to prevent blowouts.

Figure 2:
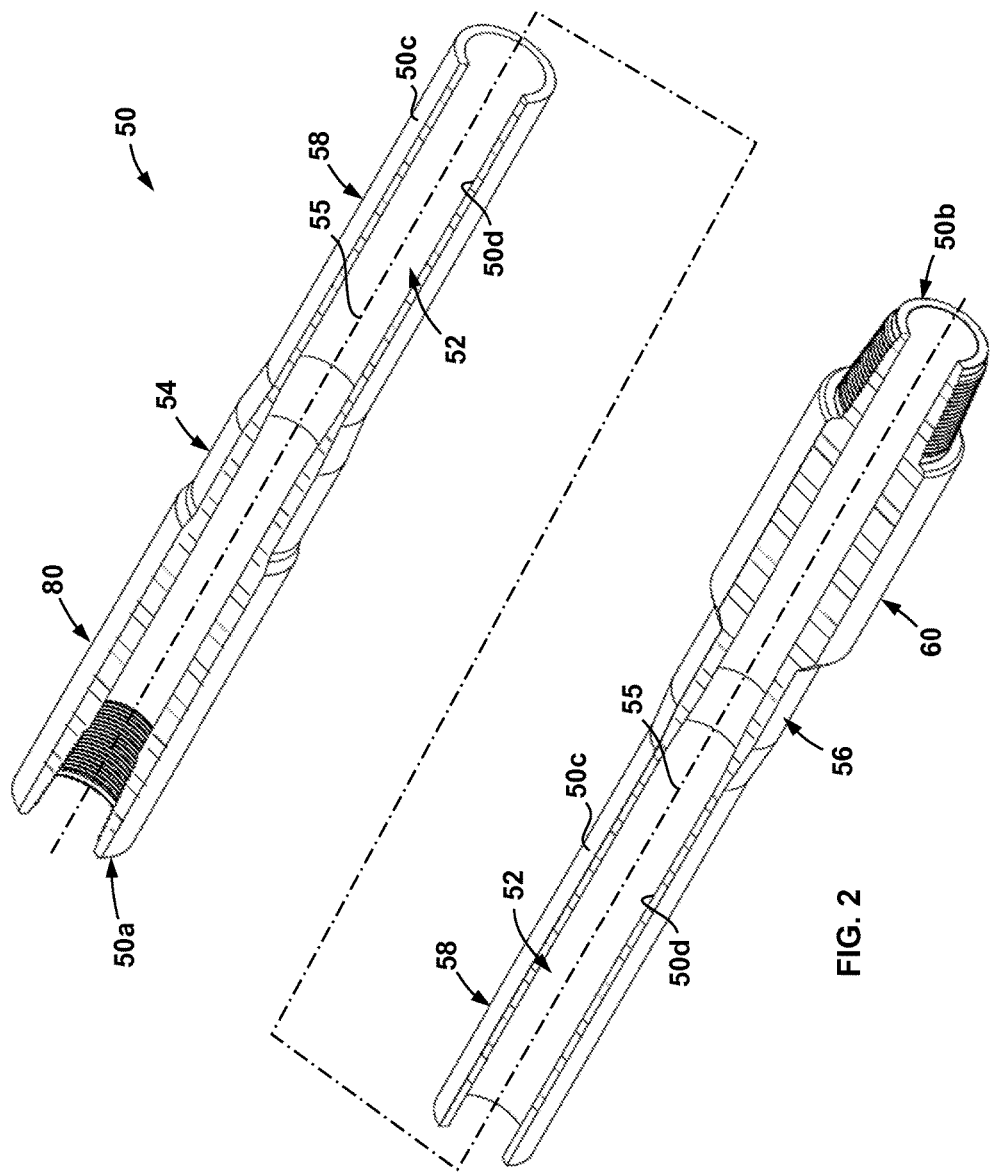
FIG. 2 is a perspective cross-sectional view of one of the drill pipes for use within the drilling system of FIG. 1.
Figure 3:
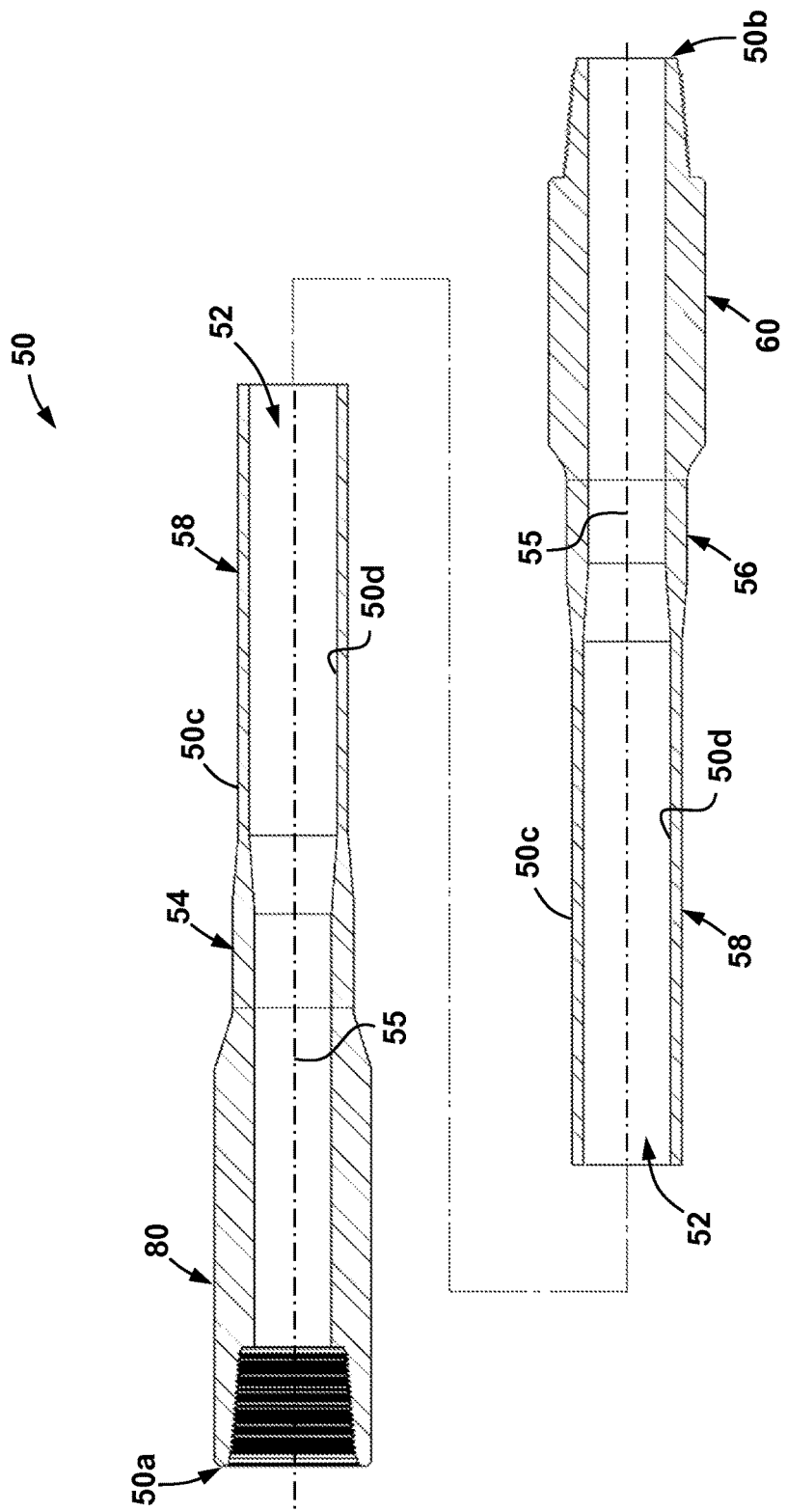
FIG. 3 is a side cross-sectional view of one of the drill pipes for use within the drilling system of FIG. 1.

Referring now to FIGS. 2 and 3, each drill pipe 50 making up drill string 30 is an elongate tubular member that is configured to be threadably connected to each adjacent drill pipe 50 or other component (e.g., drill bit 40, BHA, etc.). Each pipe 50 includes a central or longitudinal axis 55 that is aligned with axis 31 of drill string 30 during operations, a first or upper end 50a, a second or lower end 50b opposite upper end 50a, a radially outer surface 50c extending axially between ends 50a, 50b, and a radially inner surface 50d defining a throughbore 52 that also extends axially between ends 50a, 50b.

A threaded connector is disposed at each end 50a, 50b to facilitate the threaded connection of joint 50 within drillstring 30 as previously described. In particular, a female or box threaded connector 80 (or more simply "box 80") is disposed at upper end 50a and a male or pin threaded connector 60 (or more simply "pin 60") disposed at lower end 50b. As will be described in more detail below, box 80 includes a plurality of internal threads that are configured to threadably mate and connect with the threads of a pin connector (e.g., pin 60) of an axially adjacent drill pipe 50 (e.g., with respect to axis 31) and pin 60 includes a plurality of external threads that are configured to threadably mate and connect with the threads of a box threaded connector (e.g., box 80) of an axially adjacent drill pipe 50 (e.g., with respect to axis 31). Further details of box 80 and pin 60 will be described in more detail below.

Referring still to FIGS. 2 and 3, drill pipe 50 also includes a pair of upsets each extending axially from one of the threaded connectors 60, 80 to a central tubular region 58. As used herein, the term "upset" generally refers to an increase in the cross-sectional area of joint 50 relative to the cross-section area within central tubular region 58. In particular, in this embodiment, joint 50 includes a first or upper upset 54 extending axially between box 80 and central tubular region 58 and a second or lower upset 56 extending axially between pin 60 and central tubular region 58. Each upset 54, 56 includes an expanded cross-sectional area such that radially outer surface 50c is expanded radially outward from axis 55 at upsets 54, 56 relative to region 58 and radially inner surface 50d is expanded radially inward toward axis 55 at upsets 54, 56 relative to region 58. However, it should be appreciated that in other embodiments, upsets 54, 56 include a radial expansion along only one of the surfaces 50c, 50d, and in still other embodiments, no upsets 54, 56 are included on joint 50 while still complying with the principles disclosed herein.

As shown in FIGS. 2 and 3, drill pipe 50 is assembled by forming upsets 54, 56 at the axial ends of region 58. Thereafter, threaded connectors 60, 80 are secured to upsets 56, 54, respectively, by any suitable method (e.g., welding, integral formation, etc.). In addition, upsets 54, 56 may be formed on tubular region 58 by any suitable method while still complying with the principles disclosed herein. For example, in some embodiments, upsets 54, 56 are formed by heating the axial ends of tubular region 58, and impacting each heated end along axis 55, thereby forcing surface 50c, 50d to radially expand in the manner described above (and shown).

Figure 4:
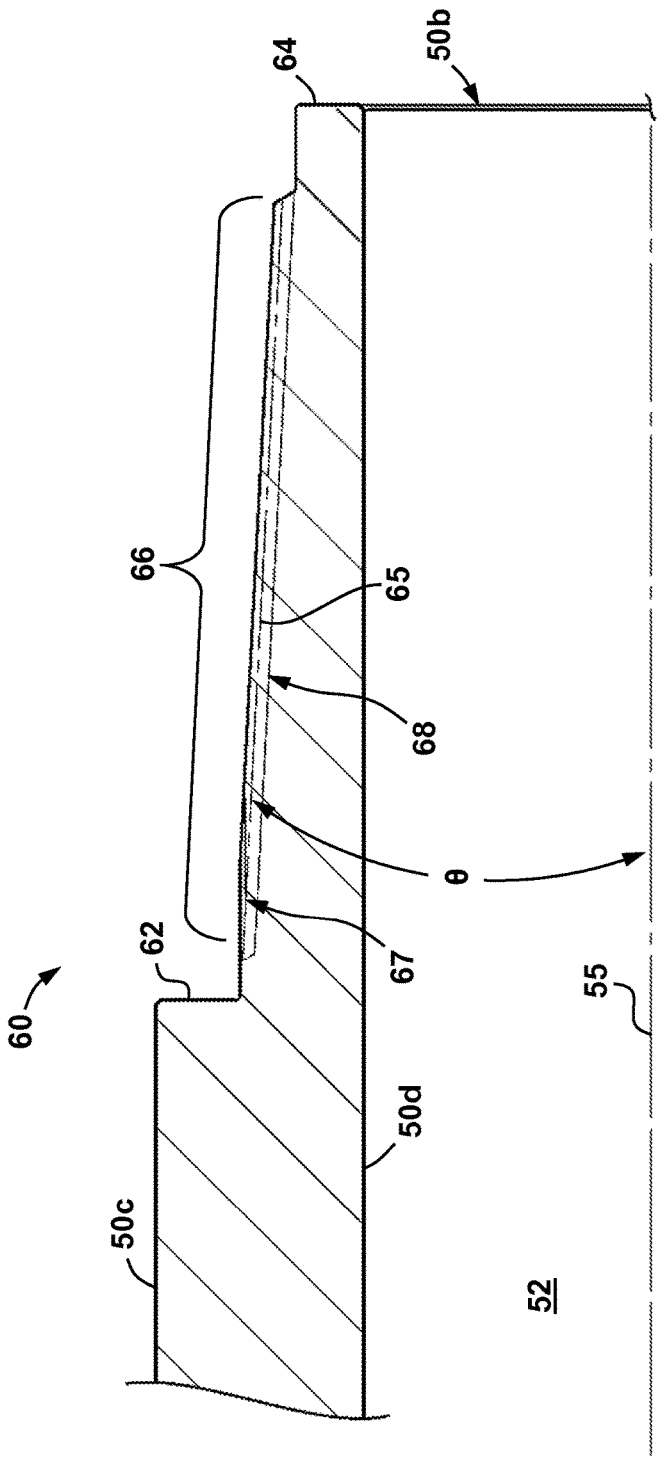
FIG. 4 is an enlarged cross-sectional view of a portion of the pin threaded connector of the drill pipe of FIGS. 2 and 3.

Referring now to FIG. 4, pin threaded connector 60 includes a first or external annular shoulder 62 that extends radially inward from radially outer surface 50c and a second or internal annular shoulder 64 that extends radially outward from radially inner surface 50d at lower end 50b. Thus, shoulders 62, 64 are axially spaced from one another along axis 55. It should be appreciated that in some embodiments, external shoulder 62 may also be referred to herein as a "pin base" 62 and internal shoulder 64 may be referred to herein as a "pin nose" 64. As will be described in more detail below, shoulders 62, 64 are configured to engage with corresponding shoulders in a box threaded connector (e.g., shoulders 82, 84, respectively on box 80) on a mating drill pipe 50.

A plurality of external threads 66 are formed along pin 60 in a region extending axially between shoulders 62, 64. External threads 66 on pin 60 are formed along a line of taper 65 that is angled relative to axis 55 at an angle θ. In this embodiment, external threads 66 preferably taper from approximately 1.0 to 1.5 inches of diameter per foot of axial length ("inches per foot" or "in/ft") (i.e., the angle θ ranges from approximately 2.39° to 3.58°), more preferably from approximately 1.2 to 1.3 in/ft (i.e., the angle θ more preferably ranges from approximately 2.86° to 3.10°), and still more preferably at 1.25 in/ft (i.e., the angle θ still more preferably approximately equals 2.98°). However, it should be appreciated that other values are possible for the taper and the angle θ while still complying with the principles disclosed herein. In addition, in this embodiment, threads 66 include a plurality of run-out threads 67 and a plurality of fully formed threads 68. As used herein, the term "run-out threads" refers to a set of one or more threads that are not fully formed along pin 60. Specifically, run-out threads 67 represent a region where the cutting tool (e.g., a profile) used to form (i.e., cut) the threads into pin 60 is gradually disengaged with or radially moved away from the outer surface of pin 60 such that threads 67 are gradually cut at an decreasing depth as the cutting tool is moved axially along axis 55 away from end 50b after cutting fully formed threads 68.

Figure 5:
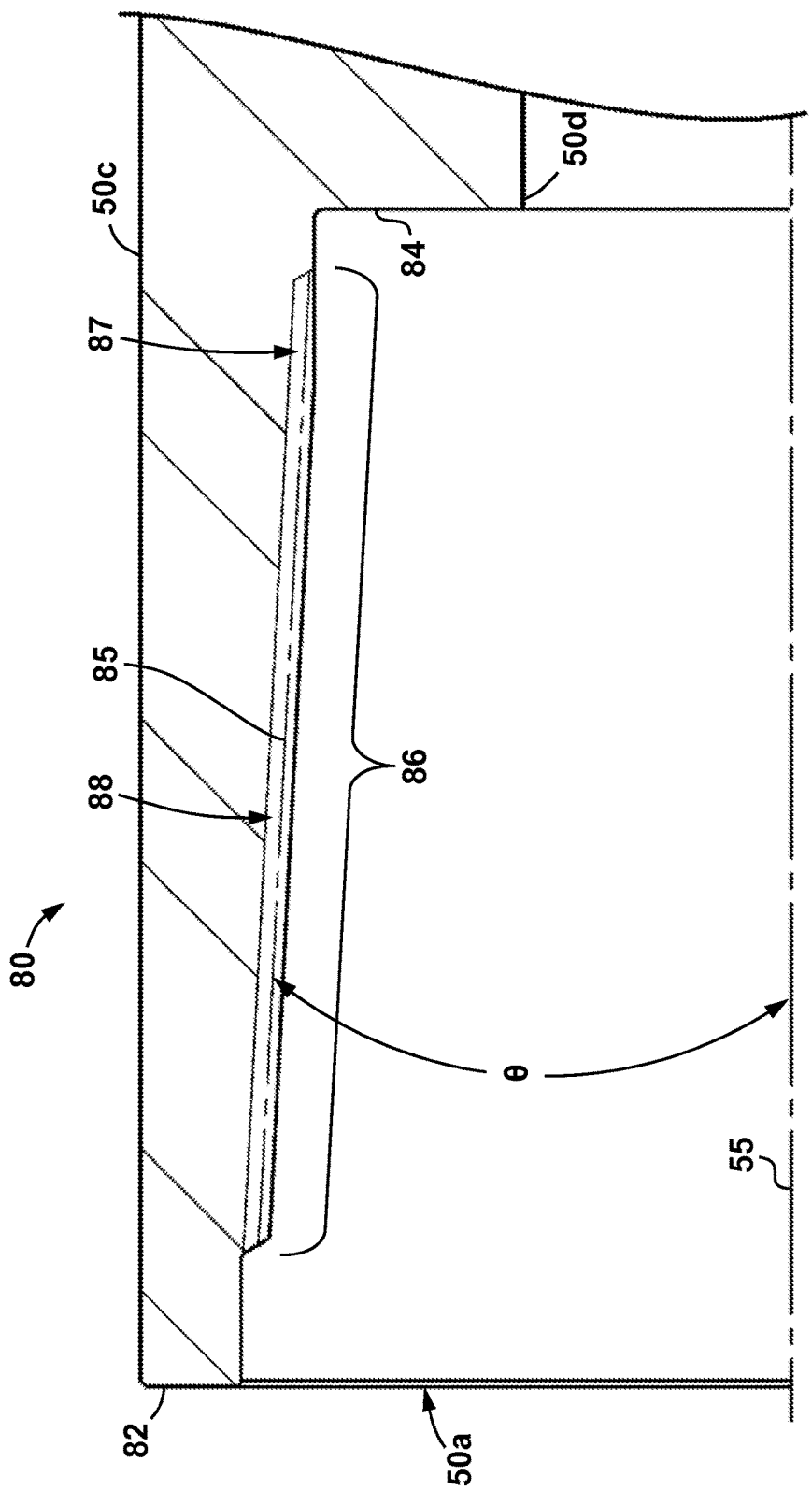
FIG. 5 is an enlarged cross-sectional view of a portion of the box threaded connector of the drill pipe of FIGS. 2 and 3.

Referring now to FIG. 5, box threaded connector 80 includes a first or external annular shoulder 82 that extends radially inward from radially outer surface 50c at upper end 50a and a second or internal shoulder 84 that extends radially outward from radially inward from radially inner surface 50d. Thus, shoulders 82, 84 are axially spaced from one another along axis 55. It should be appreciated that in some embodiments, external shoulder 82 may also be referred to herein as a "box nose" 82 and internal shoulder 84 may also be referred to herein as a "box base" 84. As will be described in more detail below, shoulders 82, 84 are configured to engage with corresponding shoulder in a pin threaded connector (e.g., shoulders 62, 64, respectively on pin 60) on a mating drill pipe 50.

A plurality of internal threads 86 are formed along box 80 in a region extending axially between shoulders 82, 84. Internal threads 86 on box 80 are formed along a line of taper 85 that is angled relative to axis 55 at the angle θ, which is substantially the same as previously described for line 65 of internal threads 66 of pin 60, previously described. Thus, threads 86 on box 80 taper relative to axis 55 from approximately 1.0 to 1.5 in/ft (i.e., the angle θ ranges from approximately 2.39° to 3.58°), more preferably from approximately 1.2 to 1.3 in/ft (i.e., the angle θ more preferably ranges from approximately 2.86° to 3.10°), and still more preferably at 1.25 in/ft (i.e., the angle θ still more preferably approximately equals 2.98°). Like threads 66 on pin 60, internal threads 86 includes a plurality of run-out threads 87 and a plurality of fully formed threads 88, where the term "runout" is utilized in the same manner as described above for threads 66.

Figure 6:
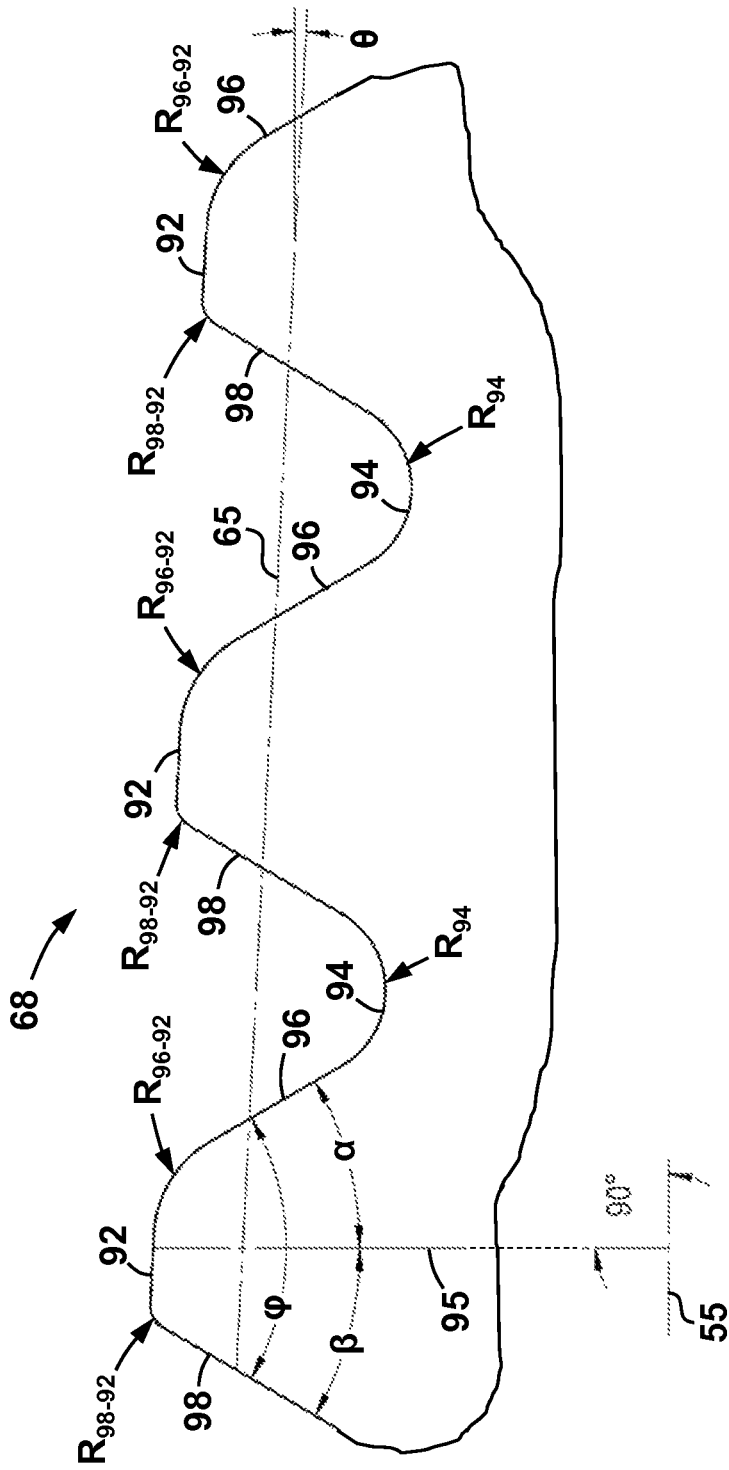
FIG. 6 is an enlarged cross-sectional view of the fully formed threads disposed on the pin threaded connector of FIG. 4.

Referring now to FIG. 6, fully formed threads 68 on pin 60 are shown. It should be appreciated that fully formed threads 88 on box 80 are formed substantially the same as threads 68, except that threads 88 are flipped both horizontally and vertically relative to threads 68. As a result, the description below of threads 68 fully describes threads 88 and a separate detailed description of threads 88 is omitted in the interest of brevity.

Each thread 68, includes a crest 92, a root 94 radially spaced from crest 92, a leading or stab flank 96 extending between crest 92 and root 94, and a following or load flank 98 extending between crest 92 and root 94 of the immediately axially adjacent thread 68 along axis 55. Thus, as one of ordinary skill would appreciate, the stab flank 96 of each thread 68 is more proximate the pin internal shoulder 64 than the pin load flank 98 on that same thread 68. Similarly, while not specifically shown, one of ordinary skill will also appreciate that the stab flank 96 on each thread 88 is more proximate the box external shoulder 82 than the load flank 98 of that same thread 88. In this embodiment, since threads 68 are external threads disposed on pin 60, crest 92 of each thread 68 is radially spaced outward from each root 94; however, for each internal thread 88 on box 80, crest 92 is radially spaced inward of each corresponding root 94. Each stab flank 96 is angled relative to a radial line 95 extending from axis 55 at an angle α, each load flank 98 is angled relative to radial line 95 at an angle β, and each corresponding pair of flanks 96, 98 on each threads 68 are angled relative to one another at an angle φ, which is the sum of the angles α and β (i.e., φ=β+α). In this embodiment, the angles α and β are equal to one another, and each is equal to 30°. As a result, in this embodiment, the angle φ is approximately equal to 60°. However, it should be appreciated that other angles are possible, and thus, in other embodiments the values of the angles α, β, and φ may range greatly while still complying with the principles disclosed herein.

In addition, the transitions between each of the crests 92, roots 94, and flanks 96, 98 are curved or radiused. In particular, in this embodiment, the transition between the load flank 98 and crest 92 of each thread 68 is a first radius $R_{98-92}$, the transition between the crest 92 and stab flank 96 is a second radius $R_{96-92}$, and each root 94 includes a radius $R_{94}$. For each thread 68, the radius $R_{98-92}$ has a radius of curvature that is smaller than that radius of curvature of the radius $R_{96-92}$. More particularly, in this embodiment, the radius of curvature of radius $R_{96-92}$ is more than four (4) times larger than the radius of curvature of radius $R_{98-92}$. Still more particularly, in this embodiment, the radius of curvature of radius $R_{96-92}$ is equal to 0.065 in, and the radius of curvature of radius $R_{98-92}$ is equal to 0.015 in; however, it should be appreciated that the values of radii $R_{96-92}$, $R_{98-92}$ may range greatly in other embodiments while still complying with the principles disclosed herein. In addition, in this embodiment, the radius $R_{94}$ of each root is a substantially circular radius having a radius of curvature equal to 0.05 in; however, like the radii $R_{96-92}$, $R_{98-92}$, the specific value of radius $R_{94}$ may range greatly in other embodiments. Further, threads 66 along pin 60 have an axial thread density that is typically measured in the number of threads per some unit of axial length with respect to axis 55 (i.e., threads per inch or "TPI"). In particular, in this embodiment, threads 66 on pin (and thus threads 86 on box 80) have a thread density ranging between 2 and 4 TPI, and preferably have a thread density of 3 threads per inch. It should be appreciated that other embodiments may preferably have a thread density of 3.5 TPI, and that still other embodiments may have higher or lower threads densities while still complying with the principle disclosed herein.

Figure 7:
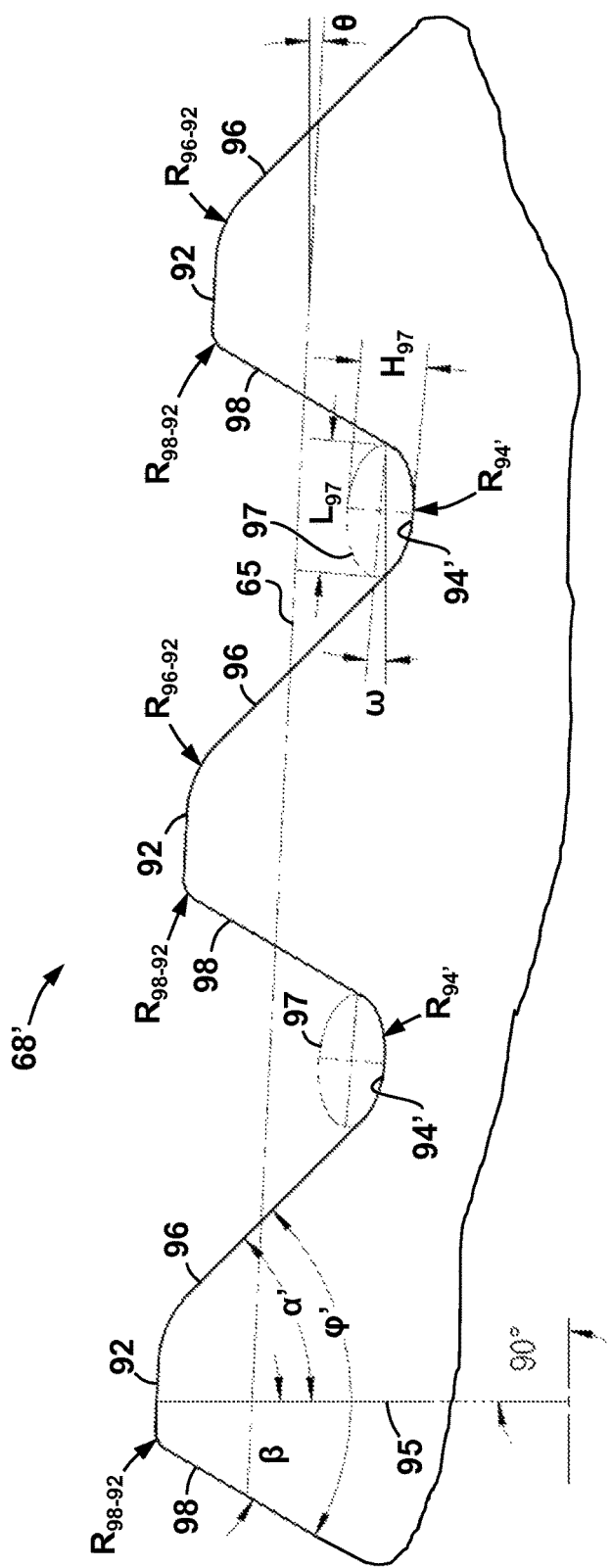
FIG. 7 is an enlarged cross-sectional view of an alternative embodiment of the fully formed threads disposed on the pin threaded connector of FIG. 4.

Referring now to FIG. 7, an alternative embodiment of fully formed threads (designated as threads 68') on pin 60 is shown. Threads 68' are substantially similar to threads 68 previously described, and thus, like numerals are used to designate like components and the discussion below will concentrate on the difference between threads 68', 68. In particular, each stab flank 96 is oriented at the angle α' relative to radial line 95 rather than the angle α and the flanks 96, 98 of each thread 68' are angled relative to one another at the angle φ' rather than the angle φ. In at least some embodiments, the angle α' is larger than the angle β. In particular, in this embodiment, the angle α' is equal to 45° while the angle β remains at 30° such that the angle φ' is equal to 75° (i.e., φ'=α'+β). However, it should be appreciated that the specific values for the angles α', β, and φ' may range greatly in other embodiments while still complying with the principles disclosed herein.

Figure 9:
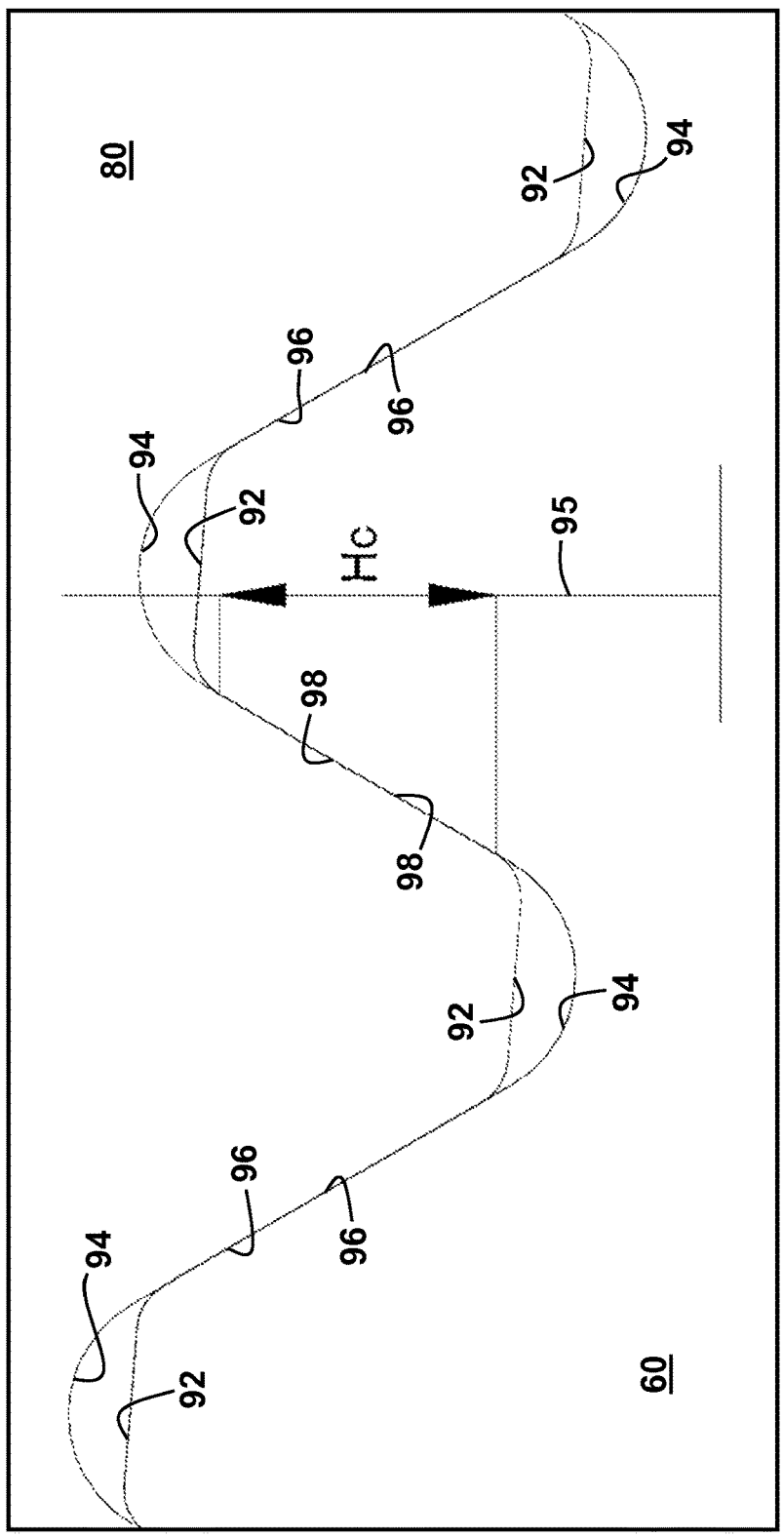
FIG. 9 is an enlarged cross-sectional view of engaged threads within the connection of FIG. 8.

In addition, threads 68' include a root 94' in place of the circular profiled root 94 on threads 68. As is shown in FIG. 7, root 94' includes an elliptical profile when viewed radially in cross-section (i.e., the view shown in FIG. 7). In particular, root 94' is cut or otherwise formed to conform to a portion of the outer surface of an imaginary ellipse 97 that is shown in FIG. 9 for clarity. Ellipse 97 includes a length $L_{97}$ oriented along the major axis and a height $H_{97}$ oriented along the minor axis of the ellipse 97. In this embodiment, the length $L_{97}$ is approximately equal to 0.080 in and the height $H_{97}$ is approximately equal to 0.040 in, and thus, in at least some embodiments, the length $L_{97}$ is approximately twice the height $H_{97}$. Although, it should be appreciated that other values and relationships for both length $L_{97}$ and $H_{97}$ are possible while still complying with the principles disclosed herein. Also, as is also shown in FIG. 7, ellipse 97 defining root 94' is canted or rotated relative to the centerline (e.g., axis 55) at an angle ω that in some embodiments ranges from 0° to 10°, and is preferably equal to 5°.

Further, it should be appreciated that when threads 68' are utilized on pin 60 in place of threads 68, threads 88 on box are similarly formed to match threads 68' (and would in this case be designated as threads 88') except that threads 88' would be flipped both horizontally and vertically relative to threads 68'. As result, the description above of threads 68' fully describes threads 88' and a separate detailed description of threads 88' is omitted in the interest of brevity.

Figure 8:
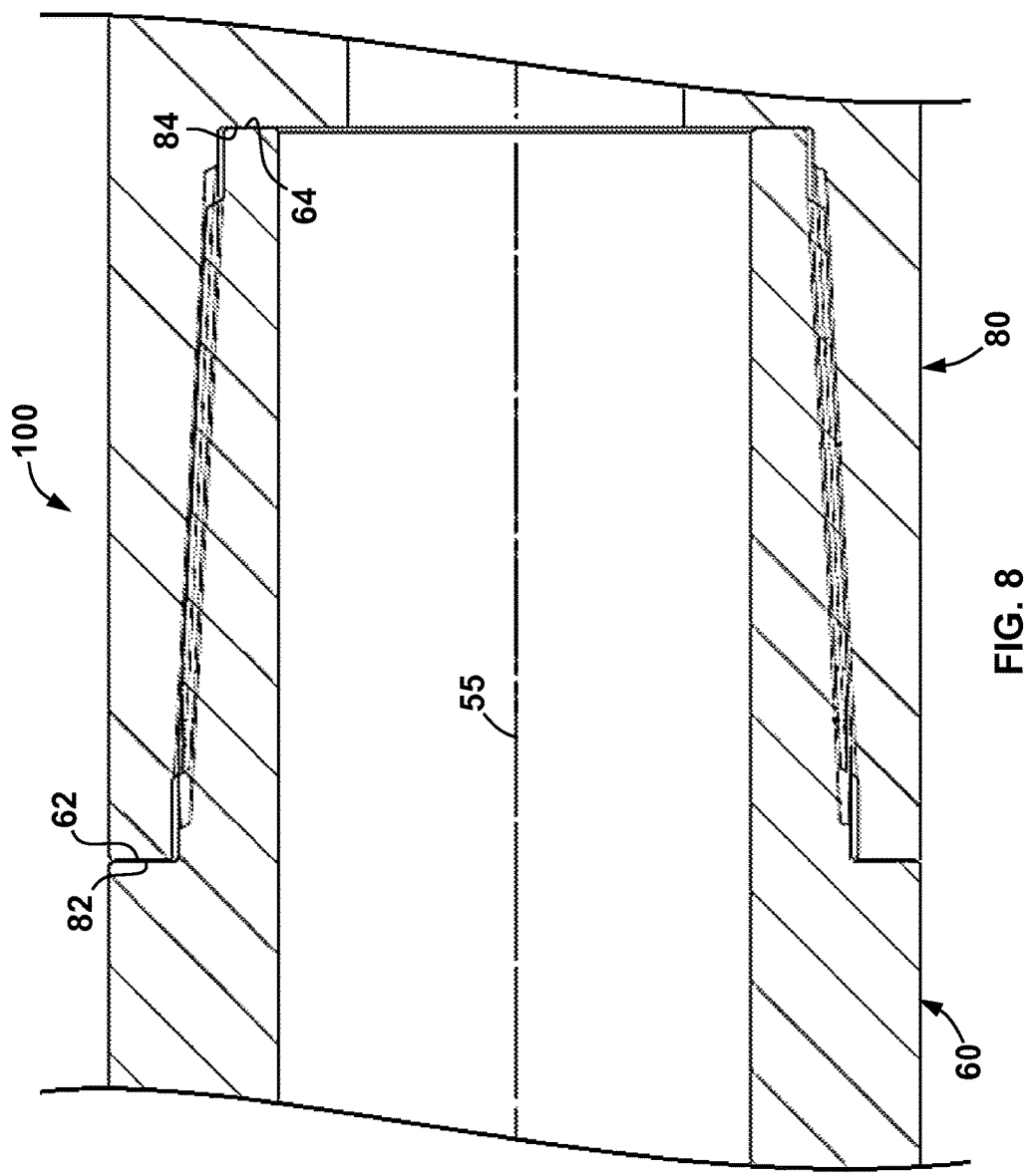
FIG. 8 is an enlarged cross-section view of a threaded connection formed by the threaded pin connector of FIG. 4 and the box threaded connector of another tubular member.

Referring now to FIGS. 8 and 9, regardless of the particular thread form used (e.g., threads 68, 88 or 68', 88') during connection operations pin 60 is threadably engaged with a box 80 on another drill pipe 50 to form a threaded connection 100. In particular, pin 60 and box 80 are threadably engaged with one another by aligning the axes 55 of each pipe 50 and rotating one pipe 50 (e.g., the pipe 50 carrying pin 60) about the aligned axes 55 relative to the other pipe 50 (e.g., the pipe 50 carrying box 80). When pin 60 is threadably engaged with box 80 in the manner described, external shoulder 62 on pin 60 engages with external shoulder 82 on box 80 and internal shoulder 64 on pin 60 engages with internal shoulder 84 on box 80. Thus, connection 100 may be referred to here in a dual or double shouldered threaded connection.

In addition, as is best shown in FIG. 9, when pin 60 is threadably engaged with box connector 80, the stab flanks 96 of the corresponding threads 68, 88 engage with one another, the load flanks 98 of corresponding threads 68, 88 engage with one another, and crest 92 on each of the threads 68, 88 is proximate a root 94 on a corresponding thread 88, 68, respectively (or root 94' when threads 68', 88' are employed). Further, when pin 60 and box 80 of two tubular joints 50 are threadably mated as described above, a contact height $H_C$ is formed which represents the projected radial distance (e.g., along radius 95 from axis 55) along which each corresponding mating pairs of threads 68, 88 engage one another along mating load flanks 98. It should be appreciated that while FIG. 9 shows only the engagement of threads 68, 88, the same or similar engagement shown is achieved when threads 68', 88' are instead employed on pin 60 and box 80.

Referring now to FIGS. 4-8, threads 66, 86 (e.g., particularly threads 68, 88 or alternatively threads 68', 88') on pin 60 and box 80, respectively are formed, sized, and arranged such that the resulting bearing strength and shear strength of connection 100 are substantially balanced. As previously described, such a balance is advantageous as it avoids an overall reduction in the resulting torsional strength of the connection 100 caused by over designing connection 100 for either bearing or shear strength (e.g., which may cause the resulting threads to be either too tall or too long, respectively).

In particular, without being limited to this or any other theory, the bearing strength $S_B$ of connection 100 may be calculated by the following equation:

$$S_B = 2\pi Y_s R_t L_t (TPI) H_C;$$

where:

$Y_s$ is the yield strength of the material making up the connection 100;
$L_t$ is the axial length of the threaded region of the pin 60 (which may be measured from a defined gauge point along pin 60 less the pin nose length);
$R_t$ is the mean thread radius; and
TPI is thread density per unit length along the central axis (e.g., axis 55) and is typically represented in the number of threads per inch of axial distance.

In addition, without being limited to this or any other theory, the shear strength $S_{SH}$ of threaded connection 100 may be calculated by the following equation:

$$S_{SH} = \frac{\pi}{\sqrt{3}} Y_s R_t L_t.$$

When these equations for bearing strength $S_B$ and shear strength $S_{SH}$ are equated, the following relationship is produced:

$$2\pi Y_s R_t L_t (TPI) H_C = \frac{\pi}{\sqrt{3}} Y_s R_t L_t;$$

which reduces to:

$$2(TPI)H_C = \frac{1}{\sqrt{3}}.$$

When this expression is further reduced it results in the following relationship:

$$2\sqrt{3}(TPI)H_C = 1.$$

Thus, according to the principles disclosed herein, pin 60 and box 80 are configured such that the relationship $2\sqrt{3}(TPI)H_C$ for the resulting connection 100 is approximately equal to 1 or is substantially close to 1. In other words, in at least some embodiments, the resulting connection 100 is sized and arranged such that $2\sqrt{3}(TPI)H_C$, is greater than or equal to 0.95 and less than or equal to 1.05 (i.e., $0.95 \leq 2\sqrt{3}(TPI)H_C \leq 1.05$). As a result, in at least some embodiments, the resulting connection 100 may exhibit a shear strength that is within +/−5% of the bearing strength. In one specific example, the threads on pin 60 and box 80 are configured and arranged such that they have a TPI of 3.0 and a resulting $H_C$ of 0.0967 in (thereby causing the relationship $2\sqrt{3}(TPI)H_C$ to equal 1.00). In still another specific example, the threads on pin 60 and box 80 are configured and arranged such that they have a TPI of 3.5 and a resulting $H_C$ of 0.0830 in (thereby causing the relationship $2\sqrt{3}(TPI)H_C$ to equal 1.01).

Figure 10:
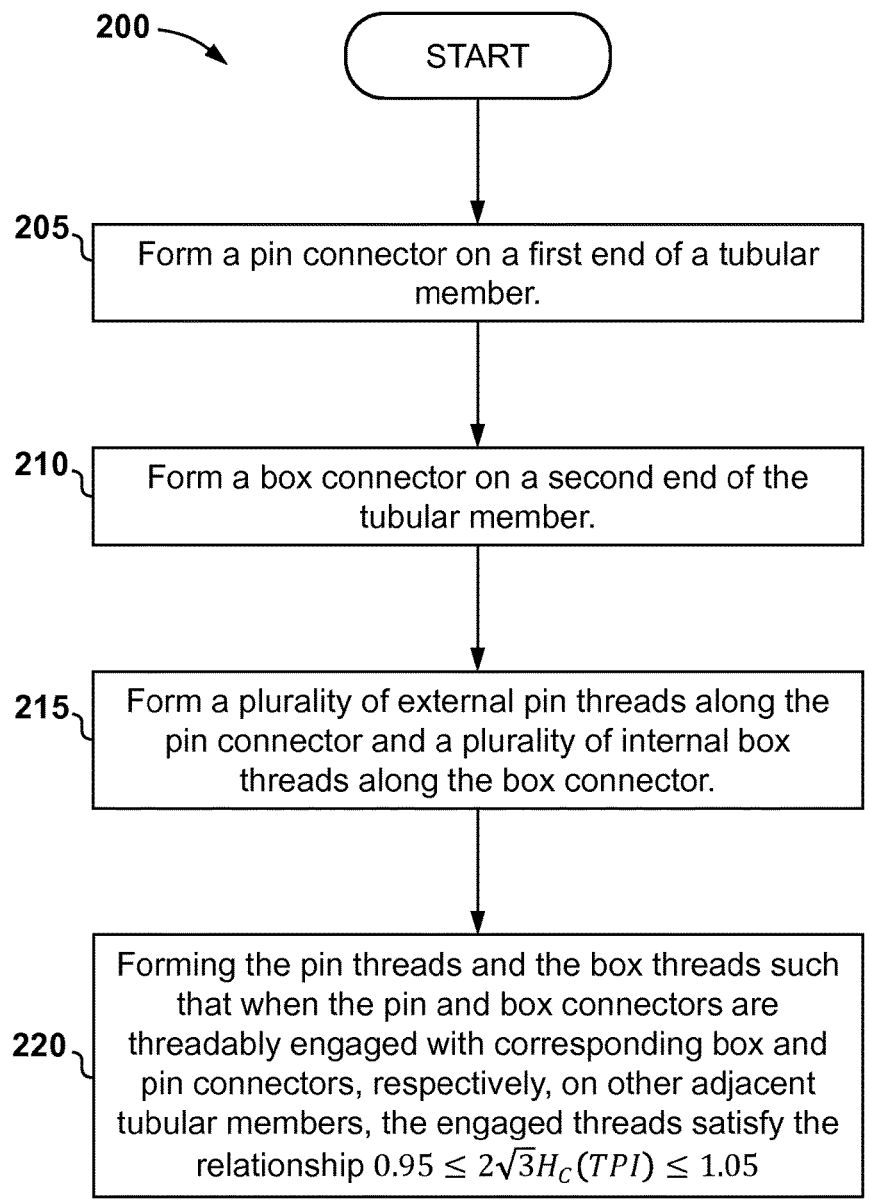
FIG. 10 is a block diagram of a method for manufacturing a tubular member in accordance with the principles disclosed herein.

Referring now to FIG. 10, a method 200 for manufacturing a tubular member (e.g., tubular joints 50) is shown. Initially the method 200 includes forming a pin connector (e.g., pin 60) on a first end (e.g., lower end 50b) of a tubular member (e.g., joint 50) and forming a box connector (e.g., box 80) on a second end (e.g., upper end 50a) of the tubular member in blocks 205 and 210, respectively. Next, method 200 includes forming a plurality of external pin threads (e.g., threads 66) on the pin connector and a plurality of internal box threads (e.g., threads 86) on the box connector in block 215. Finally, in block 220 method 200 includes forming the pin threads and box threads such that when they are engage with threads on box and pin connectors, respectively, on other adjacent tubular members, the engaged threads satisfy the relationship $0.95 \leq 2\sqrt{3}(TPI)H_C \leq 1.05$, where $H_C$ and (TPI) are the same as previously described above.

In the manner described, a threaded connection in accordance with the principles disclosed herein (e.g., connection 100) is formed that includes threads (e.g., threads 68, 88, 68', 88') having substantially balanced shear and bearing strengths. Therefore, through use of a threaded connection in accordance with the principle disclosed herein (e.g., connection 100) the torsional strength of the connection is optimized.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of this disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A tubular member having a longitudinal axis, a first end, a second end opposite the first end, and comprising:
    a first threaded box connector disposed at the first end;
    a first threaded pin connector disposed at the second end, wherein the first pin connector includes:
        a pin external shoulder configured to engage a box external shoulder on a second threaded box connector of another tubular member when the pin connector is threadably engaged with the second box connector;
        a pin internal shoulder axially spaced from the pin external shoulder, wherein the pin internal shoulder is configured to engage with a box internal shoulder on the second box connector when the pin connector is threadably engaged with the second box connector; and
        a plurality of threads in a region between the pin external shoulder and the pin internal shoulder that taper relative to the longitudinal axis at 1.0 to 1.5 inches per foot, wherein each of the plurality of threads includes:
        a crest;
        a root disposed radially inward from the crest;
        a stab flank extending between the crest and the root; and
        a load flank extending between the crest and the root, wherein the stab flank is more proximate the pin internal shoulder than the load flank;
    wherein the plurality of threads has an axial density measured in a number of threads per inch (TPI);
    wherein when the pin connector is threadably engaged with the second box connector, each of the plurality threads on the threaded pin connector contacts a corresponding box thread on the second box connector along a projected radial distance $H_C$ measured in inches along the load flank; and
    wherein the plurality of threads are configured such that the product of $2(\sqrt{3})(H_C)(TPI)$ is greater than or equal to 0.95 and less than or equal to 1.05.

2. The tubular member of claim 1, wherein each of the threads further includes:
    a first radius extending between the crest and the stab flank and having a first radius of curvature; and
    a second radius extending between the crest and the load flank and having a second radius of curvature;
    wherein the first radius of curvature is larger than the second radius of curvature.

3. The tubular member of claim 2, wherein the first radius of curvature is at least four times larger than the second radius of curvature.

4. The tubular member claim 3, wherein the first radius of curvature is 0.065 in, and wherein the second radius of curvature is 0.015 in.

5. The tubular member of claim 1, wherein the stab flank on each of the threads is oriented at a first angle α relative to a radius of the longitudinal axis, and wherein the load flank of each of the threads is oriented at a second angle β relative to the radius, wherein α is equal β.

6. The tubular member of claim 1, wherein the stab flank on each of the threads is oriented at a first angle α relative to a radius of the longitudinal axis, and wherein the load flank of each of the threads is oriented at a second angle β relative to the radius, wherein α is larger than β.

7. The tubular member of claim 6, wherein α is equal to 45° and β is equal to 30°.

8. The tubular member of claim 7, wherein the root of each of the threads has an elliptical curvature when viewed in cross-section along the longitudinal axis.

9. The threaded pin connector of claim 1, wherein the plurality of threads taper relative to the longitudinal axis at 1.2 to 1.3 inches per foot.

10. A method for manufacturing a tubular member including a longitudinal axis, a first end, and a second end opposite the first end, the method comprising:
    (a) forming a threaded pin connector on the first end of the tubular member, wherein the threaded pin connector includes a pin external shoulder and a pin internal shoulder axially spaced from the pin external shoulder;
    (b) forming a threaded box connector on the second end of the tubular member, wherein the threaded box connector includes a box external shoulder and a box internal shoulder axially spaced from the box external shoulder; and
    (c) forming a plurality of pin threads along the pin member in a region between the pin external shoulder and the pin internal shoulder and a plurality of box threads along the box member in a region between the box external shoulder and the box internal shoulder, wherein the pin threads and the box threads each taper relative to the longitudinal axis at 1.0 to 1.5 inches per foot, and wherein the plurality of the pin threads and the plurality of box threads have an axial density measured in a number of threads per inch (TPI), and wherein each of the plurality of pin threads and each of the plurality of box threads includes:
    a crest;
    a root;
    a stab flank extending between the crest and the root; and
    a load flank extending between the crest and the root, wherein the stab flank on each pin thread is more proximate the pin internal shoulder than the load flank on the pin thread, and wherein the stab flank on each box thread is more proximate the box external shoulder than load flank on the box thread;

wherein when the pin member is threadably engaged with a box member on another tubular member, each of the plurality of pin threads contacts a corresponding box thread along a projected radial distance $H_C$ along the load flank;

wherein when the box member is threadably engaged with a pin member on a another tubular member, each of the plurality of box threads contacts a corresponding pin thread along the projected radial distance $H_C$ measured in inches along the load flank; and wherein the plurality of pin threads and box threads are configured such that the product of $2(\sqrt{3})(H_C)(TPI)$ for the pin threads and the box threads is greater than or equal to 0.95 and less than or equal to 1.05.

11. The method of claim 10, further comprising:
(d) forming a first radius having a first radius of curvature between the crest and the stab flank of each of the plurality of pin threads and each of the plurality of box threads; and
(e) forming a second radius having a second radius of curvature between the crest and the load flank of each of the plurality of pin threads and each of the plurality of box threads, wherein the first radius of curvature is larger than the second radius of curvature.

12. The method of claim 10, wherein (c) further comprises:
(c1) forming the stab flank of each of the plurality of pin threads and each of the plurality of box threads at an angle $\alpha$ relative to a radius of the longitudinal axis; and
(c2) forming the load flank of each of the plurality of pin threads and each of the plurality of box threads at an angle $\beta$ relative to the radius, wherein the angle $\alpha$ is larger than the angle $\beta$.

13. The method of claim 10, wherein (c) further comprises:
(c1) forming the stab flank of each of the plurality of pin threads and each of the plurality of box threads at an angle $\alpha$ relative to a radius of the longitudinal axis; and
(c2) forming the load flank of each of the plurality of pin threads and each of the plurality of box threads at an angle $\beta$ relative to the radius, wherein the angle $\alpha$ is equal to the angle $\beta$.

14. The method of claim 10, further comprising:
(d) forming an elliptical curvature for the root of each of the plurality of pin threads and for the root of each of the plurality of box threads.

15. The method of claim 10, wherein (c) comprises forming the plurality of pin threads and the plurality of box threads to have a TPI of 3.5 and an $H_C$ of 0.0830 in.

16. The method of claim 10, wherein (c) comprises forming the plurality of pin threads and the plurality of box threads to have a TPI of 3.0 and an $H_C$ of 0.0967 in.

* * * * *